United States Patent Office 3,849,575
Patented Nov. 19, 1974

---

3,849,575
THIOSEMICARBAZONES AS ANTI-FERTILITY AGENTS
Richard L. Elton, Chester, N.J., assignor to
Sandoz-Wander, Inc., Hanover, N.J.
No Drawing. Continuation-in-part of abandoned application Ser. No. 187,880, Oct. 8, 1971. This application Jan. 26, 1973, Ser. No. 326,603
Int. Cl. A61k 27/00
U.S. Cl. 424—323                                           8 Claims

ABSTRACT OF THE DISCLOSURE

Certain thiosemicarbazones have been found to be useful as anti-fertility agents.

---

This application is a continuation-in-part of copending application Ser. No. 187,880, filed Oct. 8, 1971 and now abandoned.

The present invention relates to the use, as anti-fertility agents, of certain thiosemicarbazones of the formula

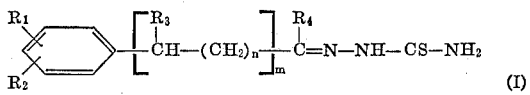

wherein $R_1$ and $R_2$, independently, are hydrogen, halogen, (e.g. fluorine, bromine or preferably, chlorine), or alkyl of 1 to 3 carbon atoms,
$R_3$ and $R_4$, independently, are hydrogen or alkyl containing 1 to 3 carbon atoms,
$m$ is 0 or 1, and
$n$ is 0, 1, or 2 and to pharmaceutical compositions containing said thiosemicarbazones as an active ingredient.

Compounds of formula (I) in which $m$ is 1 are known from Swiss Pats. 478,778 and 484,082. These patents, however, disclose said compounds only as intermediates for the preparation of corresponding phenylalkyl thiosemicarbazides.

It has now been discovered that compounds of formula (I) possess pharmacological activity, in particular anti-fertility activity in female animals, especially mammals. This new use has been indicated by the absence of implantation sites in female rats given fourteen successive daily injections, starting on the day of vaginal cornification, cohabited on a 1:1 ratio with male rats of known fertility from the time of the fourth injection until 72 hours after the last injection, and sacrificed on the day of separation from the males. Compounds were tested at dosage levels of 2, 5 and 10 mg./day. This test is a variation of the test method described by Harrington and Linkenheimer, *J. Repro. Fert.* (1966) 11, 73–84, at page 75.

Compounds of the formula (I) in which $R_3$ and one of $R_1$ and $R_2$ are hydrogen are preferred, especially those in which the other of $R_1$ and $R_2$ is halogen, particularly chlorine. Typical of the most preferred compounds is the compound of the formula

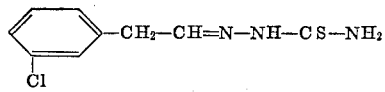

The pharmaceutically acceptable acid addition salts of compounds of formula (I) are also useful for the purposes of the present invention. Such salts possess the same order of activity as the free base, are readily prepared by reacting the base with an appropriate acid, and accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate maleate, malate, tartrate, methane-sulfonate, cyclohexylsulfamate and the like.

The thiosemicarbazones of formula (I) can be prepared by reacting a compound of the formula

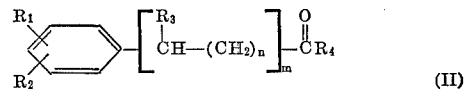

wherein $R_1$, $R_2$, $R_3$, $R_4$, $m$ and $n$ are as defined above, with thiosemicarbazide ($H_2N$—$NH$—$CS$—$NH_2$), in the manner disclosed in Swiss Pat. 478,778. The compounds of formula II are generally known or can be produced in known manner, as by hydrogenating or alkylating the corresponding acyl chloride.

The compounds of formula (I) may be administered orally in such forms as tablets, dispersible powders, granules, capsules, syrups and elixirs, parenterally as solutions, suspensions, dispersions, emulsions, and the like, e.g. a sterile injectable aqueous suspension or in suppository form. The compositions for oral use may contain one or more conventional adjuvants, such as sweetening agents, flavoring agents, coloring agents, and preserving agents, in order to provide an elegant and palatable preparation. Tablets may contain the active ingredient in admixture with conventional pharmaceutically acceptable excipients, e.g. inert diluents, such as calcium carbonate, sodium carbonate, lactose and talc, granulating and disintegrating agents, e.g. starch and alginic acid, binding agents, e.g. starch, gelatin and acacia, and lubricating agents, e.g. magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g. suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g. calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90% of the active ingredient in combination with the carrier or adjuvant.

The dosage of active ingredient employed may vary depending on the particular compound employed and the method of administration. However, in general, satisfactory results are obtained when the compounds (I) are administered at a daily dosage of from about 1.0 milligram to about 50 milligrams per kilogram of animal body weight, preferably given as a single dose although divided doses, two to four times a day, or sustained release forms may be used. For most large mammals, the total daily dosage is from about 70 to about 350 milligrams. Dosage forms suitable for internal use comprise from about 15 to about 350 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets.

The pharmaceutical compositions of this invention are preferably administered daily during the second half of the menstrual cycle until menstruation.

The following examples are provided for the purpose of illustrating the present invention.

EXAMPLE A

STEP 1.—Preparation of 3-chlorophenylacetyl chloride

A solution of 50 g. of 3-chlorophenylacetic acid in 100 ml. of thionyl chloride is heated under reflux for 2½ hours. This solution is then cooled to ca 50° C. and maintained there while most of the excess thionyl chloride is removed under reduced pressure (ca 15 mm.). To the residue is added 50 ml. of benzene which is then removed again under reduced pressure. This procedure leaves a residue almost free of thionyl chloride and the final traces are removed by pumping under high vacuum (ca 0.01 mm.) at room temperature. The oily residue so obtained is then fractionally distilled under reduced pressure to yield 44 g. of 3-chlorophenylacetyl chloride, b.p. 92°– 95° C./0-75 mm.

STEP 2.—Preparation of 3-chlorophenylacetaldehyde

To a cooled, stirred solution (ca-75° C. Dry Ice/acetone) of 20 g. of 3-chlorophenylacetyl chloride in 100 ml. of anhydrous tetrahydrofuran is added over a period of one hour a solution of 30 g. of lithium tritertiarybutoxy aluminum hydride in 200 ml. of tetrahydrofuran. The reaction mixture is maintained at a temperature of —75° C. for a further 2 hours and then allowed to warm at room temperature. It is then poured onto a mixture of ice and brine and 500 ml. of ether is added. Sufficient 2N hydrochloric acid is added to neutralize the base present and the two layers so obtained are separated. The organic phase is washed first with sodium bicarbonate solution and then water before being dried. Removal of the solvent gives a residue which is fractionally distilled under reduced pressure to yield 6 g. of 3-chlorophenylacetaldehyde, b.p. 86° C./0.75 mm.

STEP 3.—Preparation of 3-chlorophenylacetaldehyde thiosemicarbazone

A suspension of 3 g. of finely powdered thiosemicarbazide in 250 ml. of ethanol is heated on a steam bath until a clear solution is obtained. To this is added in one portion a solution of 5 g. of 3-chlorophenylacetaldehyde in 50 ml. of ethanol. Heating on the steam bath is continued for one hour and then the solution is cooled to 0–5° C. (ice). A fine crystalline precipitate of excess thiosemicarbazine is obtained which is removed by filtration. The filtrate is concentrated to a volume of ca 50 ml. and again cooled when a crystalline precipitate is again produced. This is recrystallized from a small volume of ethanol to yield 6 g. of 3-chlorophenylacetaldehyde thiosemicarbazone, m.p. 154–157° C.

EXAMPLE B

Preparation of 2-chlorobenzaldehyde thiosemicarbazone 27.3 g. (0.3 M) Thiosemicarbazide, 700 ml. ethanol and 120 ml. water were heated to boil. In the hot solution, during stirring, was dropped a solution of 42 g. (0.3 M) of o-chlorobenzaldehyde dissolved in 100 ml. ethanol, and the mixture heated for 2 hours at reflux. The resulting mixture was concentrated under vacuum and crystals of the title product were thereby separated. The mixture was cooled in ice, filtered and the residue washed with absolute ethanol and then ether. After drying, there was obtained 58 g. of white crystals m.p. 215–216° C.

EXAMPLE C

Following the procedure of Example A or B, above, and using appropriate starting materials in approximately equivalent amounts, there are obtained:

(a) Acetophenone thiosemicarbazone m.p. 120° C., (b) 2-Methylpropiophenone thiosemicarbazone m.p. 130° C., (c) 4'-chloroacetophenone thiosemicarbazone m.p. 192°–194° C., (d) 4'-Isopropylbenzaldehyde thiosemicarbazone m.p. 151° C., (e) p-tert. Butylacetophenone-thiosemicarbazone m.p. 171°–173° C., (f) Isobutyrophenone-thiosemicarbazone m.p. 130° C.

The following Examples illustrate dosage forms which may be prepared by conventional techniques and administered once a day during the second half of the menstrual cycle until menstruation.

EXAMPLE 1

Tablets

| Ingredient: | Weight (mg.) |
|---|---|
| 3-chlorophenylacetaldehyde thiosemicarbazone | 125 |
| Tragacanth | 10 |
| Lactose | 322.5 |
| Corn starch | 25 |
| Talcum | 15 |
| Magnesium Stearate | 2.5 |

EXAMPLE 2

Dry Filled Capsules

| Ingredients: | Weight (mg.) |
|---|---|
| 3-chlorophenylacetaldehyde thiosemicarbazone | 125 |
| Inert solid diluent (starch, lactose, kaolin) | 225 |

EXAMPLE 3

Sterile Injectable Suspension

| Ingredient: | Weight (mg.) |
|---|---|
| 3-chlorophenylacetaldehyde thiosemicarbazone | 75.00 |
| Sodium carboxymethylcellulose | 1.25 |
| Methyl cellulose | 0.40 |
| Polyvinyl pyrrolidone | 5.00 |
| Lecithin | 3.00 |
| Benzyl alcohol | 0.01 |
| Buffer agent, as desired for stability. | |
| Water, as desired to 1 ml. | |

I claim:

1. A method of inhibiting fertility in a female animal in which such treatment is desired comprising internally administering to such a female animal 70 to 350 mg. per day of a compound of formula (I)

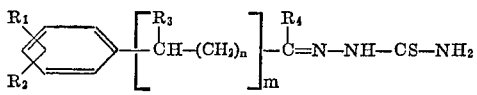

wherein $R_1$ and $R_2$, independently, are hydrogen, halogen, or alkyl of 1 to 3 carbons, $R_3$ and $R_4$ are independently hydrogen or alkyl of 1 to 3 carbons, $m$ is 0 or 1, and $n$ is 0, 1, or 2.

2. The method of claim 1 wherein the dosage rate is from 1 to 50 milligrams per day per kilogram of animal body weight.

3. The method of claim 1 wherein there is administered a compound of formula (I) wherein $R_4$ is hydrogen and $m$ is 1.

4. The method of claim 1 wherein there is administered a compound of formula I wherein $R_3$ and one of $R_1$ and $R_2$ are hydrogen.

5. The method of claim 4 wherein there is administered a compound of the formula

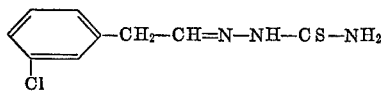

6. A method according to claim 1 wherein the compound is administered orally, parenterally, or in the form of a suppository.

7. A method according to claim 6 wherein the compound is administered orally.

8. A method according to claim 6 wherein the compound is administered by injection.

References Cited
FOREIGN PATENTS
484,082    2/1970    Switzerland _____ 424—323

FREDERICK E. WADDELL, Primary Examiner